(12) United States Patent
Yamazaki

(10) Patent No.: US 6,920,117 B1
(45) Date of Patent: Jul. 19, 2005

(54) COMMUNICATION CHANNEL SELECTING CIRCUIT CORRESPONDING TO RADIO SIGNAL INTENSITY

(75) Inventor: Kiyohiko Yamazaki, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 739 days.

(21) Appl. No.: 09/697,594

(22) Filed: Oct. 27, 2000

(30) Foreign Application Priority Data

Oct. 29, 1999 (JP) .......................................... 11/309027

(51) Int. Cl.$^7$ ................................................ H04Q 7/00
(52) U.S. Cl. ........................ 370/329; 455/464; 370/337
(58) Field of Search ................................ 370/329, 336, 370/345, 347; 455/337, 280, 462, 464, 513, 62

(56) References Cited

U.S. PATENT DOCUMENTS

| | | | | |
|---|---|---|---|---|
| 5,203,012 A | * | 4/1993 | Patsiokas et al. ........... | 455/513 |
| 5,280,471 A | * | 1/1994 | Kondou et al. ............. | 370/347 |
| 6,185,423 B1 | * | 2/2001 | Brown et al. ............... | 455/434 |
| 6,487,418 B1 | * | 11/2002 | Magana et al. ............. | 455/464 |
| 6,690,941 B1 | * | 2/2004 | Cannon et al. ............. | 455/462 |

* cited by examiner

Primary Examiner—Chau Nguyen
Assistant Examiner—Blanche Wong
(74) Attorney, Agent, or Firm—Rabin & Berdo, P.C.

(57) ABSTRACT

A communication channel selecting circuit which can select and use a channel that does not disturb or interfere with another radio apparatus, avoiding a channel occupied by other similar radio apparatus nearby, is provided. The communication channel selecting circuit selects a communication channel in accordance with radio signal intensity, the selecting circuit transmitting and receiving radio signals in a plurality of channels. A radio unit outputs a signal indicating radio signal intensity of a radio signal received through an antenna in a receiving status and transmitting a radio signal to the antenna in a transmission status. A control circuit sets the radio unit to the receiving status even at a transmission timing. The communication channel selecting circuit further includes a timing control circuit which outputs a timing signal for each of the plurality of channels at the transmission timing, a register which stores a signal level outputted from the radio unit in the receiving status corresponding to the timing signal and a transmission receiving control circuit which compares the signal level stored in the register and selects one of the plurality of channels to transmit/receive.

18 Claims, 4 Drawing Sheets

COMMUNICATION CHANNEL SELECTING CIRCUIT CORRESPONDING TO RADIO SIGNAL INTENSITY

BACKGROUND OF THE INVENTION

The present invention relates to a circuit for selecting a channel in a communication (transmission-receiving) system having a plurality of channels such as a Time Division Multiple Access (TDMA) system. More particularly, the present invention is directed to a communication channel selecting circuit corresponding to radio signal intensity.

A Personal Handyphone system (PHS) adopted Time Division Multiple Access-Time Division Duplex (TDMA-TDD) system selects one channel from four channels, from CH1 to CH4 (4 channels for receiving and 4 channels for transmission) and performs transmission and receiving. In this TDMA-TDD system, a radio signal received from an antenna is demodulated at a receiving timing, and data is reproduced. To confirm whether the radio signal is able to be demodulated to reproduce the data without deficiencies and has sufficient intensity or not, intensity of a signal, indicating radio signal intensity converted from a radio signal, is measured/monitored at a receiving timing of each of the channels from channel 1 to channel 4.

The intensity of the signal indicating radio signal intensity is judged at the Central Processing Unit (CPU), the CPU selects a receiving channel indicating the highest intensity and, at the same time, it also selects a transmission channel corresponding to the selected receiving channel. A communication channel is thus selected in the conventional system.

The conventional channel selection process by measuring the intensity of the radio signal as described above does however have problems as outlined in the following.

In this instance, the problem is described with reference, as an example, to a cordless telephone system handset of which can transmit and receive information by radio signal. When power is applied to a main telephone of cordless telephone system or the system is reset, the operation starts with a timing of the main telephone. The main telephone, starting its operation, measures the intensity of radio signals at its own receiving timing, and selects the most intensive receiving channel. At the time of measuring, if another similar cordless telephone system is in use nearby, the main telephone, newly applying power or resetting the system, measures the radio signal intensity of the channel used by another similar cordless telephone system, and selects the same or adjacent channel used by another similar cordless telephone system.

Accordingly, transmitting the radio signal that overlaps with other radio signals in the channels already used may cause an undesirable disturbance to other radio apparatuses.

SUMMARY OF THE INVENTION

Therefore, it is an object of the present invention to provide a communication channel selecting circuit corresponding to radio signal intensity, without disturbing radio signals in a channel already used by other radio apparatuses, which overcomes the above issues in the related art. This object can be achieved by combinations described in the independent claims. The dependent claims define further advantageous and exemplary combinations of the present invention.

Corresponding to the first aspect of the present invention, a communication channel selecting circuit for selecting one of communication channels in which a radio signal is transmitted and received in accordance with a radio signal intensity thereof. The selecting circuit comprises a radio unit outputting an intensity signal indicating the radio signal intensity of the radio signal received through an antenna in a receiving status and transmitting the radio signal to the antenna in a transmission status, a control circuit setting the radio unit to the receiving status even at a transmission timing and outputting a timing signal for each of the channels during the transmission timing, a register storing a level of the intensity signal outputted from the radio unit in response to the timing signal, and a (CPU) comparing the level stored in the register and a communication control circuit selecting one of the channels for transmission and receiving.

The summary of the invention does not necessarily describe all necessary features of the present invention. The present invention may also be a sub-combination of the above described features. The above and other features and advantages of the present invention will become more apparent from the following description of embodiments taken in conjunction with the accompanying drawings.

DETAILED DESCRIPTION OF THE INVENTION

Preferred embodiments of the present invention will now be described with reference to accompanying drawings, which do not intend to limit the scope of the present invention, but exemplify the invention. All of the features and the combinations thereof described in the embodiment are not necessarily essential to the invention.

Figure 1:
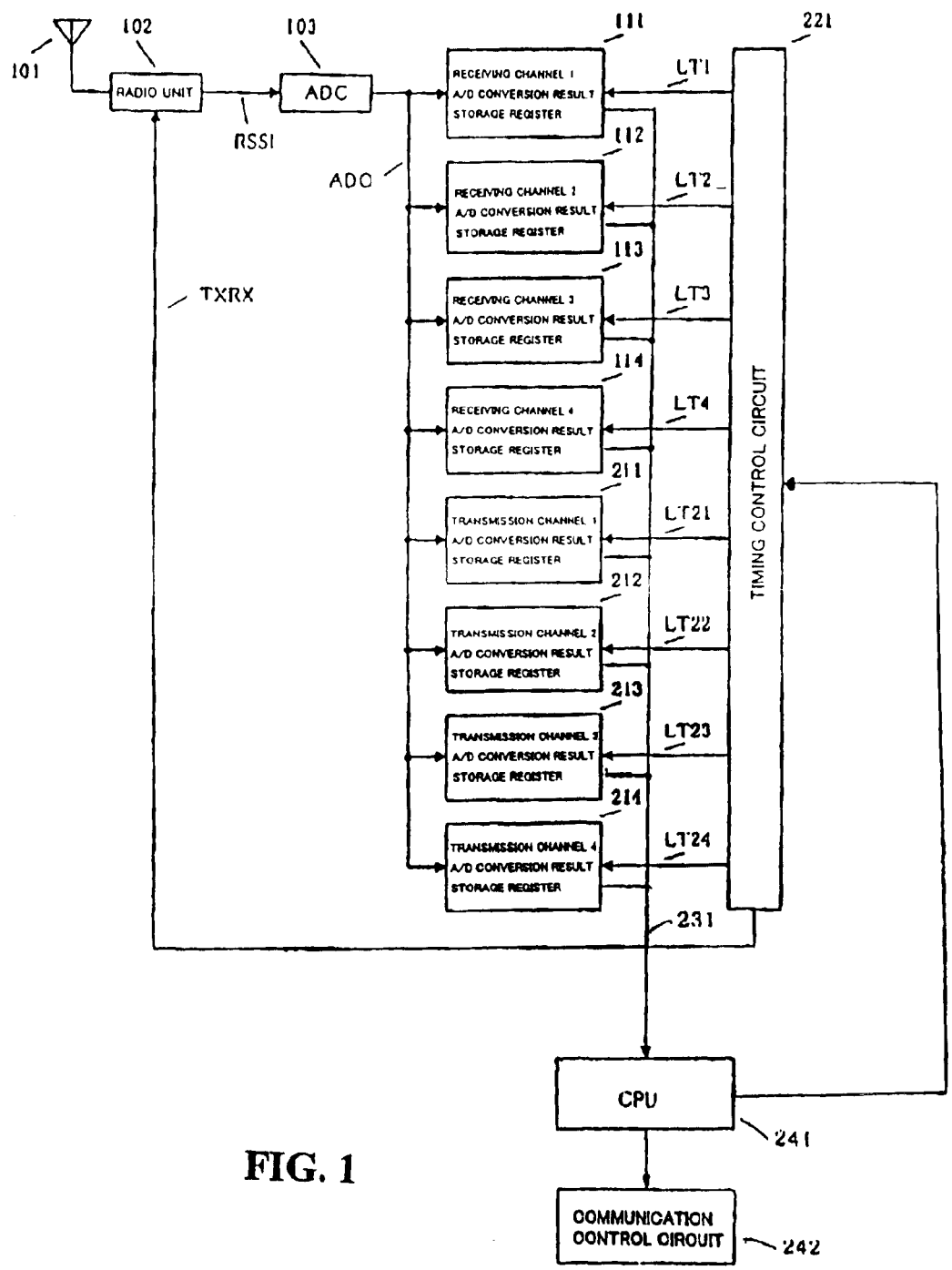
FIG. 1 is a block diagram showing a communication channel selecting circuit corresponding to radio signal intensity according to a first embodiment of the present invention.

FIG. 1 is a block diagram showing a communication channel selecting circuit corresponding to radio signal intensity according to the first embodiment of the present invention.

An antenna 101, which transmits and receives a radio signal, connects to a radio unit 102. The radio unit 102 converts the radio signal to an Receive Signal Strength Indicator (RSSI) signal, which indicates radio signal intensity and is an analog signal, and outputs the RSSI signal. The RSSI signal that indicates the radio signal intensity is inputted to an A/D converter 103. The A/D converter (indicating "ADC" in FIGS. 1 and 3) 103 digitizes the inputted analog signal and outputs a digital Analog Digital Output (ADO) signal or a result signal of the analogue/digital conversion.

In each of the registers, from the A/D conversion result storage register for the receiving channel-1 111 to the A/D conversion result storage register for the receiving channel-4 114 and from the A/D conversion result storage register for the transmission channel-1 211 to the A/D conversion result storage register for the transmission channel-4 214, which are connected to the A/D converter 103, the ADO, a result signal of the A/D conversion as a digital signal, is inputted and the registers store the inputted signal. These registers, from the A/D conversion result storage register for the receiving channel-1 111 to the A/D conversion result storage register for the receiving channel-4 114 and from the A/D conversion result storage register for the transmission channel-1 211 to the A/D conversion result storage register for the transmission channel-4 214, are timing controlled by timing signals from LT1 to LT4 and from LT21 to LT24, outputted from a timing control circuit 221. The timing control circuit 221 also outputs a switching signal TXRX that operates a switching control between transmission/receiving status of the radio unit 102. When this switching signal TXRX is "H", the radio unit 102 is at the receiving status and receives the radio signal from the antenna; when the TXRX is "L", the radio unit 102 is at a transmission status and outputs a radio signal from a transmission signal processing circuit, located in radio unit 102, to the antenna 101.

The registers, from the A/D conversion result storage register for the receiving channel-1 111 to the A/D conversion result storage register for the receiving channel-4 114 and from the A/D conversion result storage register for the transmission channel-1 211 to the A/D conversion result storage register for the transmission channel-4 214, are connected to CPU 241 via a data bus 231. This CPU 241 compares and assesses the digitized signal indicating the radio signal intensity stored in the registers, from the A/D conversion result storage register for the receiving channel-1 111 to the A/D conversion result storage register for the receiving channel-4 114 and from A/D conversion result storage register for the transmission channel-1 211 to the A/D conversion result storage register for the transmission channel-4 214. Then, the assessed result is sent to a communication control circuit 242 and the communication control circuit 242 selects a transmission and a receiving channel. In this instance CPU 241 is also connected to the timing control circuit 221, and CPU 241 controls the timing signals from LT1 to LT4 and from LT21 to LT24.

Figure 2:
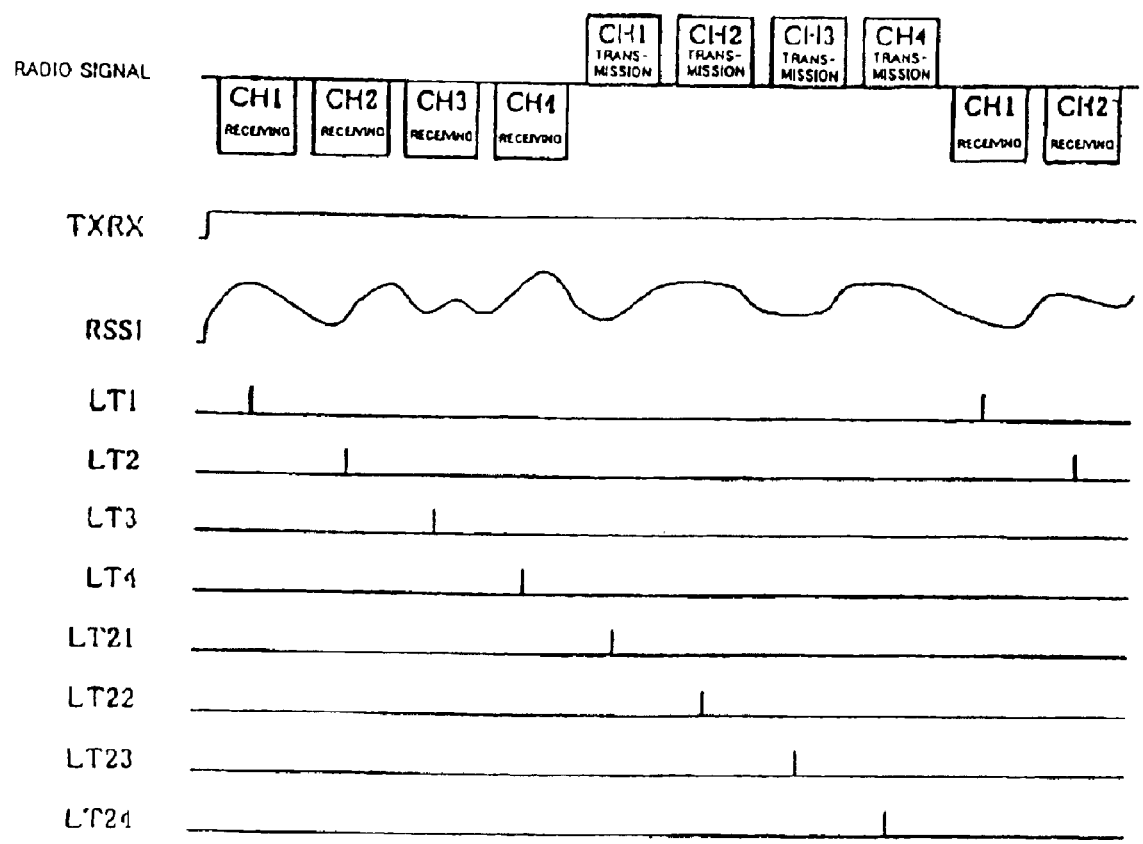
FIG. 2 is a timing chart of the operation of the communication channel selecting circuit corresponding to radio signal intensity shown in FIG. 1.

Next, referring to FIG. 2, the operation of the communication channel selecting circuit in accordance with the radio signal intensity according to the present invention will be described. FIG. 2 is a timing chart showing the operation of the communication channel selecting circuit corresponding to radio signal intensity shown in FIG. 1. A PHS using the TDMA-TDD system has four channels. In other words, the receiving channels from CH1 to CH4 and the transmission channels from CH1 to CH4 are allocated in a single frame, which is a predetermined period; and this frame is repeated.

In this embodiment, the switching signal TXRX is held at "H" in the frame shown in the figure. This means the radio unit 102 is at the receiving status for the entire period in the frame shown in the figure. That is, the radio unit 102 is not at the transmission status but rather at the receiving status while the period that transmission channels from CH1 to CH4 are allocated, which is originally a transmission timing.

RSSI, a signal indicating the receiving signal intensity outputted from the radio unit 102, continues to be outputted, because the radio unit 102 is under a receiving status while the switching signal period TXRX is "H" level. On the other hand, corresponding to the timing allocated receiving channels from CH1 to CH4 and transmission channels from CH1 to CH4 by the timing signal control circuit 221 controlled by the CPU 241, the timing signals from LT1 to LT4 and from LT21 to LT24 are sent to the registers, from the A/D conversion result storage register for the receiving channel-1 111 to the A/D conversion result storage register for the receiving channel-1 114 and from the A/D conversion result storage register for the transmission channel-1 211 to the A/D conversion result storage register for the transmission channel-4 214.

Each of the registers, from the A/D conversion result storage register for the receiving channel-1 111 to the A/D conversion result storage register for the receiving channel-4 114 and from the A/D conversion result storage register for the transmission channel-1 211 to the A/D conversion result storage register for the transmission channel-4 214, stores the ADO as a result signal of the A/D conversion outputted by the A/D converter 103, corresponding to the timing signals from LT1 to LT4 and from LT21 to LT24 received by each of the registers.

In FIG. 2, the ADO as a result signal of A/D conversion, that is an output from the A/D converter, is not shown, but the RSSI is shown as a substitution for ADO; because the ADO is the digitized RSSI indicating the receiving signal intensity.

Subsequently, the CPU 241 compares and assesses the data stored in the registers, the A/D conversion result storage register for the transmission channel-1 211 to the A/D conversion result storage register for the transmission channel-4 214; selects a channel not used from the transmission channels from CH1 to CH4; and conveys it to the communication control circuit 242. In particular, the CPU 241 assesses the data that does not reach a predetermined level from the data stored in the registers, the A/D conversion result storage register for the transmission channel-1 211 to the A/D conversion result storage register for the transmission channel-4 214, and conveys it to the communication control circuit 242. When the intensity of the radio signal at a certain transmission channel exceeds a predetermined level, other radio apparatus of a similar kind may use the transmission channel in a respectable probability.

The communication control circuit 242 selects a communication channel as directed by the CPU 241. In particular, the communication control circuit 242 selects the transmission channel directed by the CPU 241 and the receiving channel corresponding to that transmission channel and decides the communication channel.

In this instance, the data stored in the registers, the A/D conversion result storage register for receiving channel-1 111 to the A/D conversion result storage register for the receiving channel-4 114, are not used for the selection of the communication channel, but used for monitoring a receiving status in a situation such as a handset of a cordless telephone system where used over distances the radio signal becomes weak.

After the operation to select the communication channel shown in FIG. 2 is completed, in the next frame, the switching signal TXRX returns to the original level ("L" level). The switching signal TXRX becomes "H" level while the period corresponds to the receiving channels and sets the radio unit 102 at the receiving status, on the other hand, while the period corresponds to the transmission timing, TXRX becomes "L" level and sets the radio unit 102 at the transmission status.

As described above, in the first embodiment of the present invention, the radio unit 102 is at the receiving status even in the period allocated to the transmission channels and the intensity of the radio signal is measured for the period, and a communication channel for use is selected corresponding to this intensity. Therefore, avoiding channels that are the same or adjacent to the channels used by other radio apparatuses of similar kinds in a neighboring area, a channel that does not disturb other radio apparatuses can be selected and used.

Figure 3:
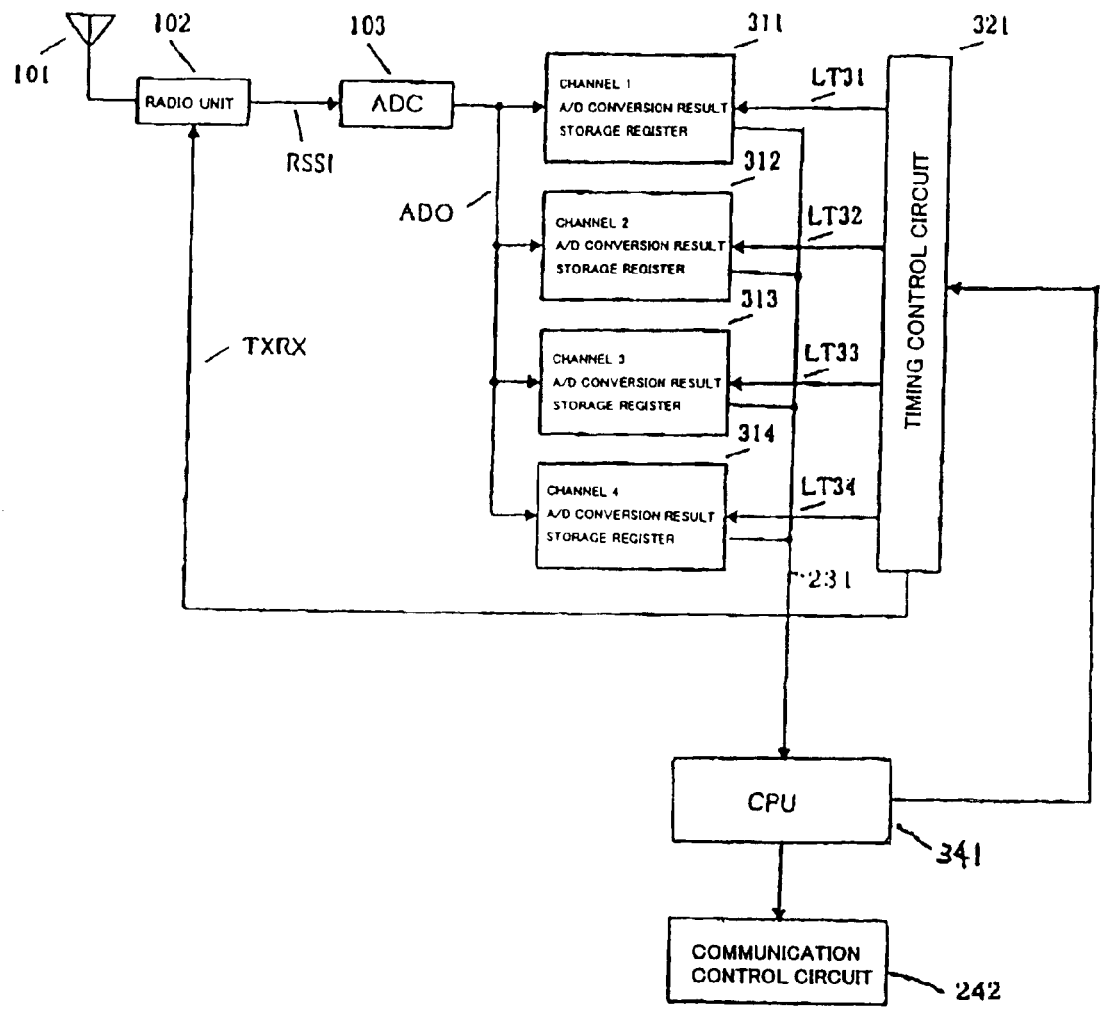
FIG. 3 is a block diagram of a communication channel selecting circuit corresponding to radio signal intensity embodying the second embodiment of the present invention.

FIG. 3 shows the circuit diagram of a communication channel selecting circuit corresponding to radio signal intensity according to a second embodiment of the present invention. In FIG. 3, the same numerals for the same components in FIG. 1 are used and the descriptions of them are omitted.

A communication channel selecting circuit of the second embodiment, the registers from a channel-1 A/D conversion result storage register 311 to a channel-4 A/D conversion result storage register 314 are connected to an A/D converter 103. An A/D conversion result signal ADO as a digital signal is inputted to each of the registers from the channel-1 A/D conversion result storage register 311 to the channel-4 A/D conversion result storage register 314, each of the registers from the channel-1 A/D conversion result storage register 311 to the channel-4 A/D conversion result storage register 314 store the inputted signal. These registers from the channel-1 A/D conversion result storage register 311 to the channel-4 A/D conversion result storage register 314 are timing controlled by the timing signals from LT31 to LT34 outputted from a timing control circuit 321. The timing control circuit 321 also outputs a switching signal TXRX to control switching between transmission/receiving status of a radio unit 102.

The registers from the channel-1 A/D conversion result storage register 311 to the channel-4 A/D conversion result storage register 314 are connected to a CPU 341 via a data bus 231. This CPU 341 compares and assesses the digitized signal indicating the radio intensity, which is stored in the registers from the channel-1 A/D conversion result storage register 311 to the channel-4 A/D conversion result storage register 314. Then, the assessed result is sent to a communication control circuit 242.

The CPU 341 is also connected to the timing control circuit 321; the CPU 341 controls timing signals from LT31 to LT34.

Figure 4:
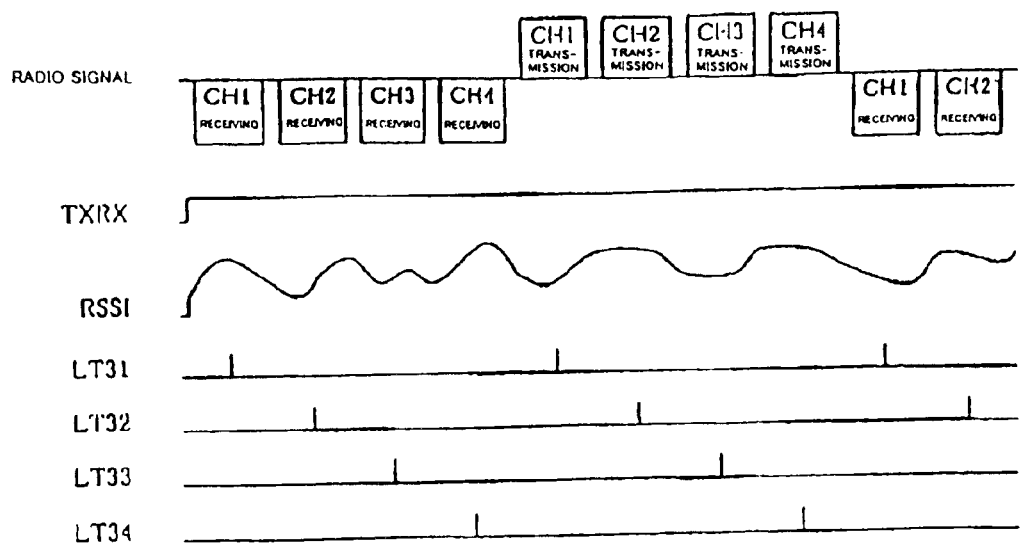
FIG. 4 is a timing chart of the operation of the communication channel selecting circuit corresponding to radio signal intensity shown in FIG. 3.

Next, referring to FIG. 4, the operation of the communication channel selecting circuit corresponding to radio signal intensity according to the second embodiment of the present invention is described. Fig. 4 is a timing chart showing the operation of the communication channel selecting circuit corresponding to radio signal intensity shown in FIG. 3. RSSI, the signal indicating the receiving signal intensity outputted from the radio unit 102, continues outputting during the period the switching signal TXRX is "H" level, because the radio unit 102 is at the transmission status. On the other hand, corresponding to the timing allocated receiving channels from CH1 to CH4 and transmission channels from CH1 to CH4 by the timing signal control circuit 321 controlled by the CPU 341, the timing signals from LT31 to LT34 are sent to the registers, from the channel-1 A/D con version result storage register 311 to the channel-4 A/D conversion result storage register 314.

Corresponding to the timing signals from LT31 to LT34 received by each of the registers, each of the registers, from the channel-1 A/D conversion result storage register 311 to the channel-4 A/D conversion result storage register 314, stores the ADO as a result signal of A/D conversion outputted by the A/D converter 103.

In this instance, the timing signals from LT31 to LT34 are sent twice in one frame, the timings of which receive channels from CH1 to CH4 are allocated and the timings of which transmission channels from CH1 to CH4 are allocated. Thus, in the registers, from the channel-1 A/D conversion result storage register 311 to the channel-4 A/D conversion result storage register 314, two amounts of data, data indicating the radio signal intensity at the timings that the receiving channels from CH1 to CH4 are allocated and data indicating the radio signal intensity at the timings that the transmission channels from CH1 to CH4 are allocated, is stored.

Following this, not shown in FIG. 4, the CPU 341 compares data indicating receiving signal intensity of the radio signals at the timing allocated to the transmission channels from CH1 to CH4 from the data stored in the registers, the channel-1 A/D conversion result storage register 311 to the channel-4 A/D conversion result storage register 314, assesses, selects a transmission channel not in use from channels CH1 to CH4, and transmits to the communication control circuit 242. In particular, the CPU 341 determines the data indicating receiving signal intensity of the radio signals at the timing allocated to the transmission channels from CH1 to CH4 that does not reach a predetermined level from the data stored in the registers, the channel-1 A/D conversion result storage register 311 to the channel-4 A/D conversion result storage register 314, and transmits it to the communication control circuit 242.

Here, the data indicating receiving signal intensity of the radio signals at the timing allocated to the receiving channels from CH1 to CH4 stored in the registers, the channel-1 A/D conversion result storage register 311 to the channel-4 A/D conversion result storage register 314, is not used for the selection of the communication channel, but rather used for monitoring the receiving status in such a situation as a handset of a cordless telephone system distances and the radio signal becomes weak.

As described above, applying the second embodiment of the present invention, in addition to the advantage of the first embodiment, the number of A/D conversion result storage registers can be decreased and the circuit can be simplified and scale-down.

In the above described embodiments, configuration of 4 channels is chosen as an example for explanation; the present invention can be applied to any configuration with a plurality of channels. The example that the radio unit is set at the receiving status for all transmission timing in the predetermined frame is explained; the radio unit can be set at a receiving status for a transmission timing of a certain channel and the configuration may detect if a certain channel is a usable channel. Furthermore, it is possible to use only one register, or to share the registers in order to reduce the number of the registers. In this case, the register(s) stores data at a plurality of timings.

As described above, according to the present invention, a radio unit is set at the receiving status and the intensity of the radio signal is measured during the period allocated to the transmission status, and corresponding to this intensity, the channel to communicate is selected. Therefore, while avoiding the channel occupied by other similar radio apparatus nearby, a channel, which does not disturb or interfere with the other radio apparatus, can be selected and used.

Although the present invention has been described by way of exemplary embodiments, it should be understood that many changes and substitutions may be made by those skilled in the art without departing from the spirit and the scope of the present invention which is defined only by the appended claims.

What is claimed is:

1. A communication channel selecting circuit for selecting one of a plurality of communication channels in which a radio signal is transmitted and received in accordance with a radio signal intensity thereof, the selecting circuit comprising:

a radio unit outputting an intensity signal indicating a level of intensity of the radio signal received through an antenna in a receiving status and transmitting the radio signal to the antenna in a transmission status;

a control circuit setting said radio unit to the receiving status even during the transmission status and outputting a timing signal for each of the plurality of communication channels during the transmission status;

a register storing the level of the intensity signal outputted from said radio unit in response to the timing signal; and a CPU comparing the level of the intensity signal stored in said register with a predetermined level, and a transmission-receiving control circuit selecting one of the plurality of communication channels for transmission and receiving based on comparing the level of the intensity signal.

2. A communication channel selecting circuit according to claim 1, wherein the intensity signal outputted from said radio unit is an analog signal.

3. A communication channel selecting circuit according to claim 2, further comprising an A/D converter converting the analog signal into a digital signal, wherein said register stores digital data representing the digital signal.

4. A communication channel selecting circuit according to claim 1, wherein the CPU compares the level of the intensity signal stored in said register, and transfers a result of the comparison to the transmission-receiving control circuit for selecting one of the plurality of communication channels for transmission and receiving.

5. A communication channel selecting circuit according to claim 1, wherein said radio unit is switched between the receiving status and the transmission status by a switching signal.

6. A method for communication by allocating a transmission and a receiving to one of a plurality of channels in a frame, comprising:

measuring an intensity of a radio signal received through an antenna in a receiving status even during a transmission status allocated to a predetermined frame;

comparing the intensity of the radio signal with a predetermined level; and selecting one of the plurality of channels for communication when the measured intensity of the radio signal in the one of the channels is less than or equal to said predetermined level based on said comparing.

7. A method for communication according to claim 6, wherein the selected one of the channels has a transmission channel and a receiving channel.

8. A method for communication according to claim 7, wherein the radio signal measured in said measuring step is transmitted in the transmission channel of the selected one of the channels.

9. A communication channel selecting circuit for selecting one of a plurality of communication channels in which a radio signal is transmitted and received in accordance with a radio signal intensity thereof, the communication channel selecting circuit comprising:

an antenna for transmission and receipt of the radio signal;

a radio unit connected to said antenna for outputting an intensity signal indicating the level of intensity of the radio signal received through the antenna in a receiving status and transmitting the radio signal to said antenna in a transmission status;

a plurality of storage circuits connected to said radio unit, each of said storage circuits storing the level of intensity signal outputted from said radio unit in response to a timing signal in each of the plurality of communication channels, respectively;

a control circuit connected to said radio unit and said storage circuits for compulsorily setting said radio unit to the receiving status during a transmission status and for outputting the timing signal to said plurality of storage circuits during the transmission status; and a CPU connected to said control circuit for comparing the level of the intensity signal stored in said storage circuits with a predetermined level, and a transmission-receiving control circuit selecting one of the plurality of communication channels for transmitting and receiving in response to the comparison.

10. A communication channel selecting circuit according to claim 9, wherein the intensity signal is an analog signal.

11. A communication channel selecting circuit according to claim 10, further comprising an A/D converter connected to said radio unit and said plurality of storage circuits for converting the analog signal into a digital signal, wherein said storage circuits store digital data representing the digital signal.

12. A communication channel selecting circuit according to claim 9, wherein the CPU is connected to said storage circuits for comparing the level of the intensity signal stored in said storage circuits, and outputs a result of the comparison to said transmission-receiving control circuit.

13. A communication channel selecting circuit according to claim 9, wherein said radio unit is switched between the receiving status and the transmission status by a switching signal.

14. A communication channel selecting circuit according to claim 13, wherein said control circuit outputs the switching signal.

15. A communication channel selecting circuit according to claim 9, wherein said plurality of communication channels comprises at least a first, a second, a third and a fourth communication channel.

16. A communication channel selecting circuit according to claim 15, wherein said storage circuits further comprise:

a first storage circuit for storing the level of the intensity signal in the first communication channel, a second storage circuit for storing the level of the intensity signal in the second communication channel, a third storage circuit for storing the level of the intensity signal in the third communication channel, and a fourth storage circuit for storing the level of the intensity signal in the fourth communication channel.

17. A communication channel selecting circuit according to claim 15, wherein each of said first, second third and fourth communication channels include a transmission channel and a reception channel.

18. A communication channel selecting circuit according to claim 17, wherein said plurality of storage circuits includes:

a first storage circuit for storing the level of the intensity signal in a first transmission channel of said first communication channel, a second storage circuit for storing the level of the intensity signal in a second transmission channel of said second communication channel, a third storage circuit for storing the level of the intensity signal in a third transmission channel of said third communication channel, a fourth storage circuit for storing the level of the intensity signal in a fourth transmission channel of said fourth communication channel, a fifth storage circuit for storing the level of the intensity signal in a first reception channel of said first communication channel, a sixth storage circuit for storing the level of the intensity signal in a second reception channel of said second communication channel, a seventh storage circuit for storing the level of the intensity signal in a third reception channel of said third communication channel, and an eighth storage circuit for storing the level of the intensity signal in a fourth reception channel of said fourth communication channel.

* * * * *